GEORGE V. MORRIS
BERTRAND J. MILLER
INVENTORS.
BY [signature]
THEIR ATTORNEY.

GEORGE V. MORRIS
BERTRAND J. MILLER
*INVENTORS.*

BY [signature]

THEIR ATTORNEY.

TELEVISION SUBSCRIBER SIGNALING SYSTEM

Original Filed March 15, 1949 3 Sheets-Sheet 3

GEORGE V. MORRIS
BERTRAND J. MILLER
*INVENTORS.*

BY [signature]

THEIR ATTORNEY

Patented Oct. 20, 1953 2,656,411

UNITED STATES PATENT OFFICE 2,656,411

TELEVISION SUBSCRIBER SIGNALING SYSTEM

George V. Morris, Melrose Park, and Bertrand J. Miller, Oak Park, Ill., assignors to Zenith Radio Corporation, a corporation of Illinois Continuation of application Serial No. 81,552, March 15, 1949. This application September 5, 1951, Serial No. 245,178

13 Claims. (Cl. 178—5.1)

Figure 1:
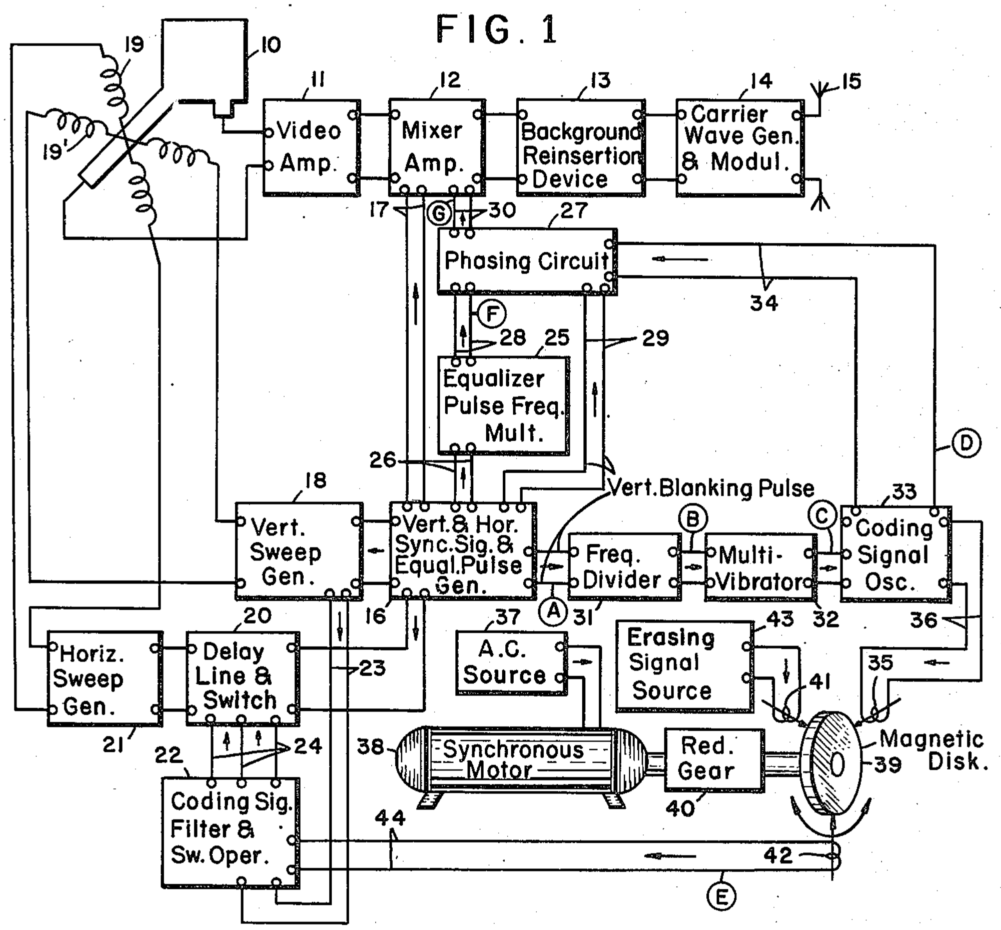

This application is a continuation of copending application Serial No. 81,552, filed March 15, 1949, and now abandoned, in the name of George V. Morris et al., entitled "Receiver for a Subscriber Signalling System" and assigned to the present assignee.

This invention relates to electrical signalling systems, and more particularly to such systems of the subscriber type in which an electrical signal is radiated in coded form for reproduction solely in subscriber receivers upon the receipt of a suitable key signal, and in which means are provided for recording the time of use of the key signal by the various receivers so that a suitable charge may be made to the individual subscribers for the subscription service.

Patent No. 2,510,046, Ellett et al., issued May 30, 1950, and entitled "Radio Wire Signalling System," and Patent No. 2,547,598, Roschke, issued April 3, 1951, and entitled "Subscription Image Transmission System and Apparatus" both assigned to the present assignee, disclose various types of subscriber signalling systems. In the systems described in those patents, a television signal is radiated to subscriber receivers in coded form and a key signal necessary to decode the coded television signal is transmitted to such receivers over a suitable line circuit, such as an existing telephone line.

The present invention is directed to a similar type of subscription system, with the exception that herein the key signal is radiated to the subscriber receivers concomitantly with the coded signals, and no line circuit is required between the transmitter and the various subscriber receivers. This system has the advantage that it avoids any objection that might be raised to the use of public utility line circuits for the distribution of the required key signal. A further advantage of the present system is that a subscriber receiver may receive the key signal and decode the coded signal whenever it is tuned to receive the coded signal, and no special effort need be made by the subscriber to request and receive this key signal.

It is, therefore, an object of this invention to provide an improved signalling system of the subscription type in which a coded television signal and a key signal for decoding the coded signal are transmitted to subscriber receivers over a common signal channel, such coded signal being decoded and reproduced in the subscriber receivers in response to the key signal.

Another object of this invention is to provide a subscription system in which a high degree of synchronism between the receiver and transmitter systems is not required, and the need for expensive and complicated synchronizing apparatus is therefore precluded.

A further object of this invention is to provide such a system in which apparatus is included at the respective subscriber receivers for determining the time of use of the key signal by each receiver so that a suitable charge may be made for the subscription service, and in which system further means are provided whereby different programs represented by the coded signal may be given different entertainment values and the apparatus at the respective receivers may be adjusted to indicate the times of use of the key signal qualified by the value of the program received, so that the charge made to the various subscribers may be modified in accordance with the quality of the programs received.

An additional object of the invention is to provide a subscriber television receiver for decoding a carrier-wave signal having modulation components representing transmitted intelligence and coded in accordance with a predetermined coding schedule.

A still further object of the present invention is to provide a subscriber television receiver for utilizing a coded carrier-wave signal having modulation components representing transmitted intelligence and having interposed key-signal components, where the modulation components occur in different modes from time to time and where each change of mode occurs a predetermined time after a corresponding one of the key signal components.

Another object of the invention is to provide a novel method of operating a subscriber receiver, and assessing a charge at the receiver, for utilizing a subscription carrier-wave signal having modulation components representing transmitted intelligence and coded in accordance with a predetermined coding pattern related to a given one of a range of subscription rates.

In accordance with one feature of the invention, a subscriber receiver for utilizing a carrier-wave signal having modulation components representing transmitted intelligence and coded in accordance with a predetermined coding schedule comprises an intelligence-reproducing device for utilizing the modulation components and means coupled to the reproducing device for controlling the device in accordance with the modulation components. A decoding apparatus is coupled to the last-mentioned means and operates in response to an applied actuating signal to vary the mode of operation of the receiver effectively to decode the modulation components as applied to the reproducing device. The receiver further includes means for developing a signal representing a first portion of the coding schedule, and a code selector, which is coupled to the last-mentioned means, for providing a second portion of the coding schedule. Finally, the subscriber receiver comprises an actuator controlled conjointly by the signal from the last-mentioned means and by the code selector, and the actuator is coupled to the decoding apparatus to supply an actuating signal thereto for operating the decoding apparatus in accordance with the combined first and second portions of the coding schedule.

In accordance with another feature of the invention, a subscriber receiver for utilizing a coded carrier-wave signal having modulation components representing transmitted intelligence and having interposed key-signal components, where the modulation components occur in different modes from time to time and each change of mode occurs a predetermined time after a corresponding one of the key-signal components, comprises an intelligence-reproducing device for utilizing the modulation components and means coupled to the device for controlling the device in accordance with the modulation components. The receiver has a decoding apparatus included in the controlling means and operates in response to an applied decoding signal to shift from one operating condition to another effectively to produce compensating changes in mode of the modulation components as applied to the reproducing device. A generator is provided which operates in response to the key-signal components to produce a decoding signal, and means is provided for applying the key-signal components to the generator. Finally, the subscriber receiver includes a time-delay apparatus coupling the generator to the decoding apparatus and exhibiting a time delay substantially equal to the predetermined time for supplying the decoding signal to the decoding apparatus with a delay of the predetermined time.

Figure 2:
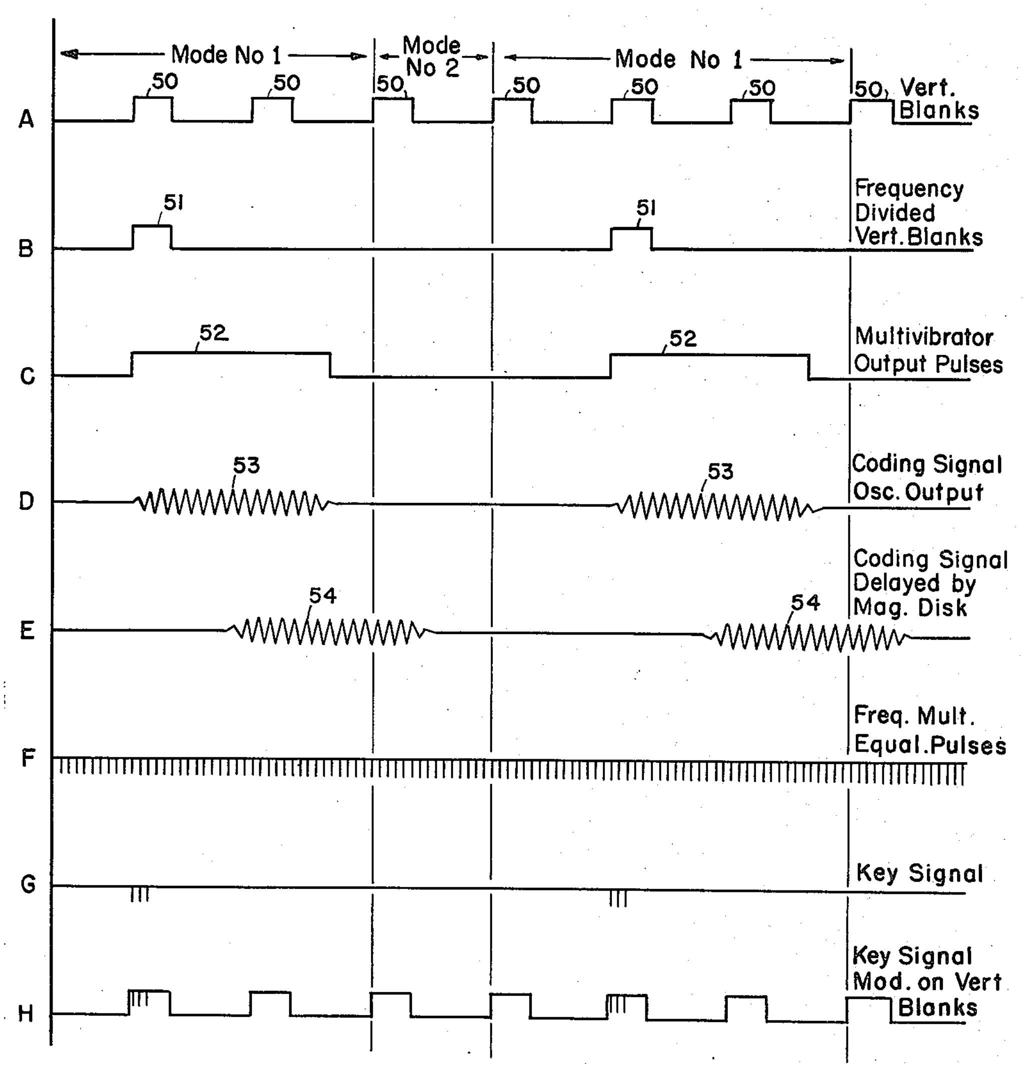
Figure 3:
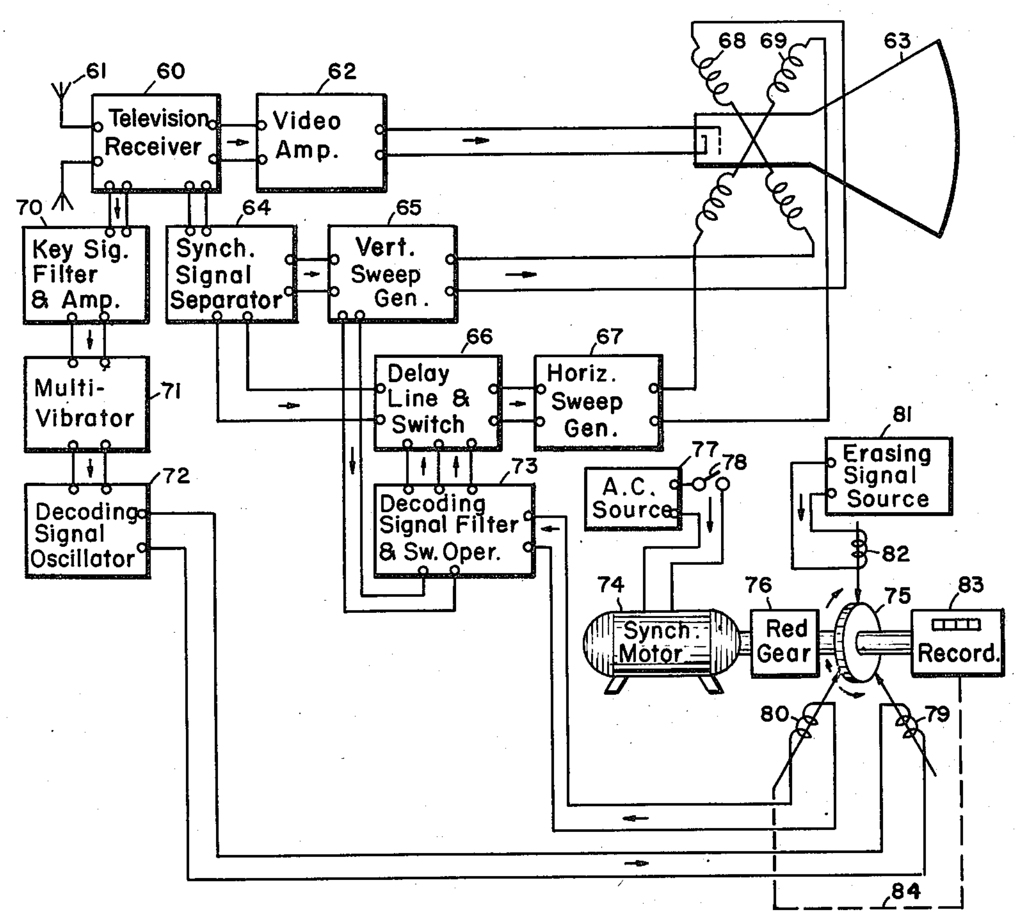

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a transmitter for producing and transmitting a carrier-wave signal having modulation components representing transmitted intelligence and coded in accordance with a predetermined coding schedule, Figure 2 shows various curves useful in the understanding of the operation of the transmitter of Figure 1, and, Figure 3 shows a receiver constructed in accordance with one embodiment of the invention for utilizing the signal transmitted from the transmitter of Figure 1.

The system of Figure 1 shows a transmitter in which a television signal is coded by altering at spaced time intervals the timing of the video-signal components relative to the synchronizing-signal components thereof, whereby the television signal is alternately transmitted in a first mode wherein the video-signal components have a certain time relation with respect to the synchronizing-signal components, and in a second mode wherein the video-signal components have an altered time relation with respect to the synchronizing-signal components. Such coding of the television signal is disclosed in the Roschke patent, and is used herein for purposes of explanation, it being understood that any desired type of coding of the television signal may be used.

Referring now to Figure 1, a picture-converting device is designated 10, the output terminals of this device being connected to a video amplifier 11 which, in turn, is connected to a mixer amplifier 12. The output terminals of the mixer amplifier 12 are connected to a background reinsertion device 13, and this device is coupled to a carrier-wave generator and modulator 14, the unit 14 being coupled to any suitable antenna 15. Vertical and horizontal synchronizing pulses, pedestals and equalizer pulses are supplied to the mixer 12 from synchronizing signal generators 16 by way of leads 17. Further terminals of the generator unit 16 are connected to a vertical sweep generator 18 which, in turn, is connected to the vertical scanning coils 19′ of the device 10. The unit 16 is also connected through a delay line and switch 20 to a horizontal sweep generator 21 which is connected to the horizontal scanning coils 19 of the device 10. The input terminals of the vertical sweep generator 18 are connected to a coding signal filter and switch operator 22 by way of leads 23, and the unit 22 is connected to the delay line and switch 20 by way of leads 24. Equalizer pulses from the generator unit 16 are supplied to an equalizer pulse frequency multiplier 25 by way of leads 26, and the output terminals of the frequency multiplier 25 are connected to a phasing circuit 27 by way of leads 28. Vertical blanking pulses from the unit 16 are supplied to the phasing circuit 27 by way of leads 29, and the output terminals of the circuit 27 are connected to the mixer amplifier 12 by way of leads 30. Vertical blanking pulses from the unit 16 are supplied to a frequency divider 31, which may be of the random type such as disclosed in copending application Serial No. 32,457, entitled "Random Frequency Divider" by Roschke, filed June 11, 1948, now issued as Patent 2,588,413 and assigned to the present assignee. The output terminals of the frequency divider 31 are connected to a multivibrator circuit 32 which, in turn, is connected to a coding signal oscillator 33, the output terminals of this oscillator being connected to the phasing circuit 27 by way of leads 34 and to a recording head 35 by way of leads 36. The input terminals of a synchronous motor 38 are connected to an alternating current source 37 which may be of the usual 60 cycle type. The motor 38 drives a magnetic disk 39, through a reduction gear 40, the magnetic disk having the previously mentioned recording head 35 and also an erasing head 41 and a pick-up head 42 associated therewith. An erasing signal source 43 is connected to the erasing head 41, and the pick-up head 42 is connected to the coding signal filter and switch operator 22 by means of leads 44.

The device 10 generates the video-signal components of the television signal transmitted by the transmitter of Figure 1. These components are amplified by the video amplifier 11 and mixed with the synchronizing-signal components of the television signal in the mixer 12 to form the composite television signal. The television signal is appropriately adjusted as to background level in the device 13 and is then modulated on a suitable carrier wave in the unit 14 and radiated from the antenna 15. The vertical sweep of the device 10 is synchronized by vertical synchronizing pulses generated in the unit 16 and impressed on the vertical sweep generator 18, and the horizontal sweep of this device is synchronized by horizontal synchronizing pulses generated in the unit 16 and impressed on the horizontal sweep generator 21 through the delay line and switch 20. The coding of the television signal is effected by delaying at spaced time intervals the video-signal components thereof relative to the horizontal synchronizing-signal components, the delay being caused by actuation of the delay line and switch 20 at these intervals. This actuation of the delay line and switch 20 causes the horizontal synchronizing pulses passing therethrough to be delayed a predetermined amount and, therefore, causes the horizontal scanning of the device 10 to be similarly delayed. Actuation of the delay line and switch 20 is controlled by the coding signal filter and switch operator 22, this operator responding to the coincidence of a burst of signal on the leads 44 with vertical blanking pulses on the leads 23. The presence of a burst of signal on the leads 44 has no effect on the operator 22 until the occurrence of the next succeeding vertical blanking pulse on the leads 23 following the initiation of such burst. By this means, each change in timing of the video-signal component as the television signal is altered from one mode to the other is made to occur during vertical retrace intervals. Therefore, since changes in mode of the television signal occur during retrace intervals, the image represented by this signal may be reproduced free of the distortion that would arise if such changes were made during trace intervals. The transmitter operation thus far described is identical to that disclosed in the aforementioned Roschke patent 2,547,598 and a further description thereof is believed to be unnecessary.

The operation of the remaining portion of the system of Figure 1 may best be understood by reference to Figure 2. The wave form of curve 2A represents vertical blanking pulses 50 which are generated in the unit 16. The horizontal synchronizing-signal components and video-signal components of the television signal occur in the intervals between the successive pulses 50, and for purposes of simplicity are not shown. In the transmitter of Figure 1, the timing of the video-signal components is altered during spaced time intervals to effect coding of the television signal. To cause such alteration in the video-signal components, the vertical blanking pulses of the wave form shown in curve 2A are supplied to the frequency divider 31 in which they are frequency divided. This frequency division is made preferably at a random rate, in which case the divider 16 may take the form of the circuit disclosed in the aforementioned Roschke Patent 2,588,413. The frequency divided pulses 51 from the divider 31 are shown in the wave form of curve 2B and these pulses are supplied to the multivibrator 32, which may be of any well known design. The multivibrator 32 is arranged to produce pulses 52, as shown in the wave form of the curve 2C, in response to the pulses 51 applied thereto. The multivibrator 32 is adjusted so that the pulses 52 have a duration corresponding to any desired number of field intervals, and in the illustrated embodiment they are shown as having a duration that is slightly longer than one field interval. The pulses 52 from the multivibrator are used to trigger the coding signal oscillator 33 to produce bursts of coding signal 53 shown in the wave form of the curve 2D. The bursts of coding signal 53 are applied to the recorder head 35 over the leads 36 and are recorded on the magnetic disk 39.

The magnetic disk 39 is driven by the synchronous motor 38 through the reduction gear 40, the synchronous motor being energized from the alternating current source 37. The speed of the magnetic disk is such that the time delay between a signal recorded on the disk by the head 35 and picked up by the head 42 corresponds to a predetermined number of field intervals. The bursts of coding signal 54 picked up by the head 42 are shown in the wave form of the curve 2E, and in the illustrated embodiment the time delay imparted to the coding signal corresponds to one field interval.

The bursts of coding signal 54 from the pick-up head 42 are supplied to the coding signal filter and switch operator 22 wherein the first vertical blanking pulse 50 succeeding the initiation of a burst 54 causes the operator to control the delay line and switch 20 to change the characteristics of the television signal from the first to the second mode. In the same manner, the first vertical blanking pulse 50 succeeding the termination of a burst 54 causes the operator 22 to control the delay line and switch 20 to change the characteristics of the television signal back to the first mode.

The pick-up head 42 is adjustable, as shown by the arrows, into several fixed positions and this head may be adjusted so that each of the coding signal bursts 54 occur a selected number of field periods later than the corresponding bursts 53 applied to the recorder head 35. Therefore, adjustment of the pick-up head into any one of its fixed positions determines the number of field intervals, after the initiation of a coding signal burst 53 by the oscillator 33, that the corresponding burst 54 is applied to the switch operator 22. The head 42 is made adjustable into these fixed positions so that the charges made to the various subscribers may be determined by the quality of the program transmitted. For example, when the head 42 is fixed in the position that the delay between the bursts 53 and corresponding bursts 54 corresponds to one field interval, a second rate program may be transmitted. Furthermore, when the head 42 is fixed so that this delay between the bursts 53 and 54 corresponds to two field intervals, a first rate program may be transmitted, and so on. In a manner to be described, means are provided at the subscriber receivers so that the cost of the programs received may be determined at an accruing rate which is a function of the field-interval delay between the bursts 53 and 54, and the time of use of a received key signal.

An erasing signal from the source 43 is supplied to the erasing head 41, and this signal erases the bursts 54 after they have passed the pick-up head 42. Therefore, each burst 53 supplied to the recorder head 35 is recorded on the disk 39, picked up a short interval later by the head 42, and then erased by the head 41.

The bursts of coding signal 53 appearing on the leads 34 cause bursts of multiplied equalizer pulses to be inserted in the television signal to form a key signal, in a manner similar to that disclosed in copending application Serial No. 75,988, Herrick et al., entitled "Subscriber Signalling System," filed February 12, 1949, and assigned to the present assignee. To this end these bursts are impressed on the phasing circuit 27 together with frequency multiplied equalizer pulses from the frequency multiplier 25, shown in wave form in curve 2F, and vertical blanking pulses from the unit 16. The coincidence of each burst of coding signal on the leads 34 and a portion of the corresponding blanking pulses on the leads 29, causes the phasing circuit 27 to act as a gate and pass a properly timed burst of frequency multiplied equalizer pulse as shown in the wave form 2G. These bursts of frequency multiplied equalizer pulses are supplied to the mixer amplifier 12 over the leads 30, and appear as a key signal on the corresponding vertical blanking pulses as shown in wave form 2H. It is apparent from an inspection of Figure 2 that two vertical blanking pulses of the radiated signal occur within the duration of each key-signal burst and would be modulated with the frequency-multiplied equalizer pulses. However, as will be evident hereinafter, only the first such modulated blanking pulse is effective at the receiver and, hence, for simplicity and convenience only the modulation of that blanking pulse has been represented in curve 2H.

The key signal so inserted in the coded television signal indicates in each instance to a subscriber receiver that after a predetermined interval corresponding to a certain number of field periods, the timing of the video-signal component is to be changed from a first mode to a second, this predetermined interval depending upon adjustment of the pick-up head 42 of Figure 1.

A subscriber receiver system for utilizing the signal received from the transmitter of Figure 1, according to one embodiment of the invention, is shown in Figure 3. This system comprises a television receiver unit 60 which may be coupled to a suitable antenna 61. The unit 60 includes the usual radio-frequency amplifier, first detector, intermediate frequency amplifier and second detector stages conventionally used in television receivers. The output terminals of the unit 60 are connected to a video amplifier 62 of any desired number of stages, and the output terminals of this amplifier are coupled to the control electrode and cathode of a receiver image reproducing device 63. The unit 60 is also connected to a synchronizing signal separator 64, this separator being connected to a vertical sweep generator 65, and through a delay line and switch 66 to a horizontal sweep generator 67. The vertical sweep generator 65 and horizontal sweep generator 67 are connected respectively to the vertical deflection coils 68 and horizontal deflection coils 69 of the device 63. The unit 60 is further connected to a key signal filter and amplifier 70, the output terminals of this filter and amplifier being connected to a multivibrator circuit 71, which in turn is connected to a decoding signal oscillator 72. The vertical sweep generator 65 is connected to a decoding signal filter and switch operator 73 to supply vertical blanking pulses thereto. A synchronous motor 74 drives a magnetic disk 75 through a reduction gearing unit 76, this motor being connected to an alternating current source 77, through a switch 78.

The decoding signal oscillator 72 is connected to a recording head 79 associated with the disk 75, and a pick-up head 80 associated with this disk is connected to the decoding signal filter and switch operator 73. The decoding signal recorded on the disk 75 by the head 79 is erased therefrom by means of an erasing signal from a source 81 which is supplied to an erasing head 82 associated with the disk. A recorder 83 is also driven by the motor 74 and records the revolutions of this motor to determine the charges to be made to the subscriber for the use of the subscription television signal. The pick-up head 80 is mechanicallly coupled to the recorder 83 as shown by the dotted line 84, and movement of this head acts to change the recording rate of the recorder, for reasons to be described.

A subscription television signal of the type transmitted by the system of Figure 1 may be received over the antenna 61 and amplified and detected in the unit 60. The coded signal is amplified in the video amplifier 62 and impressed on the reproducing device 63, in the usual manner. The synchronizing-signal components of the received signal are separated therefrom in the synchronizing signal separator 64, and vertical synchronizing pulses are impressed on the vertical sweep generator 65 to synchronize the vertical sweep of the device 63. Similarly, horizontal synchronizing pulses from the separator 64 are impressed on the horizontal sweep generator 67 through the delay line and switch 66 to synchronize the horizontal sweep of the device 63. The delay line and switch 66 is actuated by the switch operator 73 at appropriate spaced time intervals according to the change in timing from one mode to the other of the video-signal components of the received television signal. Such actuation of the delay line and switch 66 acts to delay the timing of the horizontal sweep of the device 63 during the spaced time intervals an amount identical to the delay in the video-signal components during these intervals, and this compensates for the delay and causes device 63 to reproduce correctly the image represented by the received television signal.

The actuation of the delay line and switch 66 by the operator 73 is caused to occur at the appropriate times by the key signal carried by the received television signal. This key signal is removed from the television signal by the filter and amplifier 70, and used to trigger the multivibrator 71, which in turn controls the decoding signal oscillator 72. The multivibrator 71 is adjusted to produce pulses having the same duration as the pulses 52 from the multivibrator 32 at the transmitter. Bursts of decoding signal are obtained from the oscillator 72, therefore, each of which occur at the same instant that a corresponding burst of coding signal 53 occurs at the transmitter of Figure 1 from the oscillator 33 and having the same duration as the coding signal bursts. The bursts of decoding signal from the oscillator 72 are recorded on the disk 75 by means of the recording head 79, and these bursts are picked up from the disk by means of the pick-up head 80 a predetermined number of field periods later and impressed on the operator 73 where they act jointly with vertical blanking pulses from the vertical sweep generator 65 to cause this operator to actuate the delay line and switch 66 during the same spaced intervals that the delay line and switch 20 of the transmitter of Figure 1 is actuated. In this manner, the timing of the horizontal sweep of the receiver image reproducing device 63 is altered during the spaced time intervals when the timing of the video-signal components of the received television signal is altered, and the device 63 correctly reproduces the image represented by the television signal. As in the case of the transmitter the key signal is erased from the disk 75 when it has passed the pick-up head 80, this erasing being effected by means of the erasing signal supplied to the erasing head 82 from the erasing signal source 81.

As previously explained, the frequency-multiplied equalizer pulses modulated on certain vertical blanking pulses of the transmitted signal would, for the described embodiment, appear on two blanking pulses occurring in each key-signal burst 53 although the modulation of only one such pulse is shown in Figure 2. Since the multivibrator 71 of the receiver is triggered in one sense by the modulation of the first vertical blanking pulse of each pair of such pulses that are modulated by the frequency-multiplied equalizer pulses, and since the multivibrator remains triggered for the time required to generate the pulse 52 of curve 2C, the modulation of the last pulse of each pair may be disregarded.

When it is desired that the receiver reproduce conventional uncoded television signals, the switch 78 is opened disabling the motor 74, and the receiver unit 60 is tuned to any one of these desired conventional television signals. In the absence of the decoding signal burst from the pick-up head 80, the operator 73 is designed to set the delay line and switch 66 in a position where it has no effect on the horizontal synchronizing pulses passing therethrough. Therefore, when the switch 78 is open the device 63 correctly reproduces such conventional television signals.

When it is desired to reproduce a coded subscription television signal such as the type transmitted by the transmitter of Figure 1, the switch 78 is closed and the head 80, which is adjustable as shown by the arrows into several fixed positions, is adjusted so that each burst of decoding signal recorded on the disk 75 by the head 79 is impressed on the operator 73 in a delayed state, this delayed state corresponding to a predetermined number of field periods. Such adjustment of the head 80 controls the recording rate of the recorder 83, and whenever the switch 78 is closed the recorder 83 records the revolutions of the motor 74 at a rate determined by the setting of the head 80. For a relatively low quality program it may be decided that the delay in coding signal bursts between the recording head 35 and the pick-up head 42 at the transmitter is to be an interval corresponding to one field period. To decode such a program, the pick-up head 80 at the receiver must be set to a similar position to delay the bursts of decoding signal between the recording head 79 and the pick-up head 80 a time equivalent to one field period. Such an adjustment causes the recorder 83 to record at a predetermined rate. Similarly, for high quality programs the delay at the transmitter may be two field periods, and when the head 80 at the receiver is adjusted for such a delay, this adjustment causes the recorder 83 to record at a higher rate than in the case of the high quality program. The recorder 83 may be situated in any convenient location and read from time to time to determine the periodic charges to be made to the subscriber, such charges occurring on an equitable basis from the corresponding recording rates for the various degrees of quality of the subscription programs.

It is apparent that any of the units illustrated in the described embodiment of the invention may be replaced by equivalent units without departing from the invention. For example, the disk recorders may be replaced by tape recorders, simple delay networks, or other types of signal storage devices. Furthermore, as previously stated, the invention is clearly applicable to other subscription signalling systems wherein the coding of the television signal is effected by altering characteristics thereof other than the timing of the various components constituting the signal.

One particular advantage of the present system resides in the lack of any necessity for providing therein for absolute synchronism either in phase or in speed of rotation between the disk 33 at the transmitter and the disk 75 at the receiver. This eliminates the need for expensive and complicated circuits at the transmitter and receiver to effect this absolute synchronism, and enables these disks to be driven by inexpensive synchronous motors energized from reasonably stable alternating current sources at the transmitter and at the receiver. Each code signal burst in the system is separately recorded, delayed, reproduced and erased and should the disks at the transmitter and receiver be slightly out of synchronism as to speed of rotation, the effect of this is not cumulative. Furthermore each code signal burst acts with a succeeding vertical synchronizing pulse to initiate the coding and decoding circuits and, therefore, phase discrepancies between the disks equivalent to a major portion of a field period or less do not affect the proper operation of the system.

This invention provides, therefore, a subscription television receiver that is not unduly complicated, that operates without the need of an interconnecting line circuit from the transmitter, and in which charges for the subscription service are recorded on an equitable basis determined by the number and quality of the programs received.

While a specific embodiment of the invention has been shown and described, modifications may be made. It is intended in the appended claims to cover all such modifications as fall within the true spirit and scope of the invention.

We claim:

1. A subscriber receiver for utilizing a coded carrier-wave signal having modulation components representing transmitted intelligence and having interposed key-signal components, said modulation components occurring in different modes from time to time and each change of mode occurring a predetermined time after a corresponding one of said key-signal components, said receiver comprising: an intelligence-reproducing device for utilizing said modulation components; means coupled to said device for controlling said device in accordance with said modulation components; decoding apparatus included in said means and responsive to an applied decoding signal for shifting from one operating condition to another effectively to produce compensating changes in mode of said modulation components as applied to said reproducing device; a generator responsive to said key-signal components for producing a decoding signal; means for applying said key-signal components to said generator; and time-delay apparatus coupling said generator to said decoding apparatus and exhibiting a time delay substantially equal to said predetermined time for supplying said decoding signal to said decoding apparatus with a delay of said predetermined time.

2. A subscriber receiver for utilizing a coded carrier-wave signal having modulation components representing transmitted intelligence and having interposed key-signal bursts, said modulation components occurring in different modes from time to time and each change of mode occurring a predetermined time after a corresponding one of said key-signal bursts, said receiver comprising: a reproducing device for utilizing said modulation components; circuit means for supplying said modulation components to said device; decoding apparatus coupled to said circuit means and responsive to an applied signal to shift from one operating condition to another operating condition for effectively producing compensating changes in mode of said modulation components as applied to said reproducing device; a network for selecting said key-signal bursts from said carrier-wave signal; a generator coupled to said network for producing a decoding signal in response to said key-signal bursts; storage apparatus coupled to said generator for storing said decoding signal for a time interval corresponding to said predetermined time; and means coupled to said storage apparatus for supplying the stored decoding signal to said decoding apparatus so that said compensating changes in mode occur in synchronism with the changes in mode of said modulation components.

3. A subscriber receiver for utilizing a coded carrier-wave signal having modulation components representing transmitted intelligence and having interposed key-signal components, said modulation components occurring in different modes from time to time and each change of mode occurring a predetermined time after a corresponding one of said key-signal components, said receiver comprising: an intelligence-reproducing device for utilizing said modulation components; means coupled to said device for controlling said device in accordance with said modulation components; decoding apparatus included in said means and responsive to an applied decoding signal for shifting from one operating condition to another effectively to produce compensating changes in mode of said modulation components as applied to said reproducing device; a generator responsive to said key-signal components for producing a decoding signal; means for applying said key-signal components to said generator; and adjustable time-delay apparatus coupling said generator to said decoding apparatus and exhibiting an adjustable time delay selected to be substantially equal to said predetermined time for supplying said decoding signal to said decoding apparatus with a delay of said predetermined time.

4. A subscriber television receiver for utilizing a coded television signal having interposed key-signal components, said television signal occurring in different modes from time to time and each change in mode occurring a predetermined time after a corresponding one of said key-signal components, said receiver comprising: an image-reproducing device for utilizing said television signal; means coupled to said device for controlling said device in accordance with said television signal; decoding apparatus included in said means and responsive to an applied decoding signal for shifting from one operating condition to another effectively to produce compensating changes in mode of said television signal as applied to said reproducing device; a generator responsive to said key-signal components for producing a decoding signal; means for applying said key-signal components to said generator; and time-delay apparatus coupling said generator to said decoding apparatus and exhibiting a time delay substantially equal to said predetermined time for supplying said decoding signal to said decoding apparatus with a delay of said predetermined time.

5. A subscriber television receiver for utilizing a coded television signal having interposed key-signal components, said television signal occurring in different modes from time to time and each change in mode occurring a predetermined time after a corresponding one of said key-signal components, said receiver comprising: an image-reproducing device for utilizing said television signal; means coupled to said device for controlling said device in accordance with said television signal; decoding apparatus included in said means and responsive to an applied decoding signal for shifting from one operating condition to another effectively to produce compensating changes in mode of said television signal as applied to said reproducing device; a generator responsive to said key-signal components for producing a decoding signal; means for applying said key-signal components to said generator; a recording medium; a recording head associated with said recording medium and coupled to said generator for recording said decoding signal on said medium; and a pick-up head associated with said recording medium for deriving said decoding signal therefrom with a time delay substantially equal to said predetermined time and for supplying said derived decoding signal to said decoding apparatus.

6. A subscriber television receiver for utilizing a composite television signal including synchronizing components, video components and interposed key-signal components, the time relation between said video and synchronizing components being altered from one value to another from time to time and each change in time relation occurring a predetermined time after a corresponding one of said key-signal components, said receiver comprising: an image-reproducing device and an associated scanning system for utilizing said television signal; means coupled to said reproducing device and associated scanning system for controlling said device and scanning system in accordance with said television signal; decoding apparatus coupled to said scanning system and responsive to an applied decoding signal for shifting from one operating condition to another to produce compensating changes in the timing of said reproducing device; a network for selecting said key-signal components from said television signal; a generator coupled to said network for producing a decoding signal in response to said key-signal components; and time-delay apparatus coupling said generator to said decoding apparatus and exhibiting a time delay substantially equal to said predetermined time for supplying said decoding signal to said decoding apparatus with a delay of said predetermined time.

7. A subscriber receiver for utilizing a coded carrier-wave signal having modulation components representing transmitted intelligence and having interposed key-signal components, said modulation components occurring in different modes from time to time and each change of mode occurring a predetermined time after a corresponding one of said key-signal components, said receiver comprising: an intelligence-reproducing device for utilizing said modulation components; means coupled to said device for controlling said device in accordance with said modulation components; decoding apparatus included in said means and responsive to an applied decoding signal for shifting from one operating condition to another effectively to produce compensating changes in mode of said modulation components as applied to said reproducing device; a generator responsive to said key-signal components for producing a decoding signal; means for applying said key-signal components to said generator; adjustable time-delay apparatus coupling said generator to said decoding apparatus and exhibiting an adjustable time delay selected to be substantially equal to said predetermined time for supplying said decoding signal to said decoding apparatus with a delay of said predetermined time; a time recorder having a variable recording rate for recording the operating time of the receiver; and uni-control adjusting means extending between said time-delay apparatus and said recorder for adjusting the recording rate of said recorder concurrently with the time delay of said time-delay apparatus.

8. A subscriber receiver for utilizing a coded carrier-wave signal having modulation components representing transmitted intelligence and having interposed key-signal components, said modulation components occurring in different modes from time to time and each change of mode occurring a predetermined time after a corresponding one of said key-signal components, said receiver comprising: an intelligence-reproducing device for utilizing said modulation components; means coupled to said device for controlling said device in accordance with said modulation components; decoding apparatus included in said means and having one operating condition in the absence of a decoding signal and actuable to another operating condition in the presence of an applied decoding signal effectively to produce compensating changes in mode of said modulation components as applied to said reproducing device; a generator for producing a decoding signal in response to each of said key-signal components; means for applying said key-signal components to said generator; and time-delay apparatus coupling said generator to said decoding apparatus and exhibiting a time delay substantially equal to said predetermined time for supplying said decoding signal to said decoding apparatus with a delay of said predetermined time.

9. A subscriber television receiver for utilizing a coded television signal having interposed key-signal components, said television signal occurring in different modes from time to time and each change in mode occurring a predetermined time after a corresponding one of said key-signal components, said receiver comprising: an image-reproducing device for utilizing said television signal; means coupled to said device for controlling said device in accordance with said television signal; decoding apparatus included in said means and responsive to an applied decoding signal for shifting from one operating condition to another effectively to produce compensating changes in mode of said television signal as applied to said reproducing device; a generator responsive to said key-signal components for producing a decoding signal; means for applying said key-signal components to said generator; a signal recording medium movable along a given path; a recording head coupled to said generator and positioned at one point along said path for recording said decoding signal on said medium; a pick-up head coupled to said decoding apparatus and positioned along said path at a point subsequent to and so spaced from said recording head that the decoding signal derived by said pick-up head is delayed with respect to the recording thereof by an amount equal to said predetermined time; and an erasing head positioned along said path at a point subsequent to said pick-up head for erasing the signal recorded on said medium.

10. A subscriber receiver for utilizing a carrier-wave signal having modulation components representing transmitted intelligence and coded in accordance with a predetermined coding pattern comprising: an intelligence-reproducing device for utilizing said modulation components; means coupled to said device for controlling said device in accordance with said modulation components; decoding apparatus included in said means and responsive to an applied actuating signal effectively to decode said modulation components as applied to said reproducing device; a decoding signal generator for developing an actuating signal for application to said decoding apparatus; a variable rate subscription meter; and a control mechanism coupled between said generator and said meter for concurrently conditioning said generator to develop an actuating signal corresponding to said coding pattern and for establishing a subscription rate for the utilization of said coded carrier-wave signal.

11. The method of operating a subscriber receiver, and assessing a charge at said receiver, for utilizing a subscription carrier-wave signal having modulation components representing transmitted intelligence and coded in accordance with a predetermined coding pattern related to a given one of a range of subscription rates which comprises the steps of; developing a decoding signal corresponding to said coding pattern; concurrently establishing at said receiver a subscription rate represented by said coding pattern; utilizing said decoding signal to decode said subscription signal; and reproducing the decoded subscription signal.

12. A subscriber receiver for utilizing a coded carrier wave signal having modulation components representing transmitted intelligence and having an interposed key signal, said modulation components occurring in different modes from time to time and each change of mode occurring a predetermined time after said key signal, according to a coding schedule having first and second portions, said receiver comprising: a reproducing device for utilizing said modulation components; circuit means for supplying said modulation components to said device; decoding apparatus coupled to said circuit means and responsive to an applied signal to shift from one operating condition to another operating condition for effectively compensating said different modes of said modulation components before application of said components to said reproducing device; means for extracting said key signal from said carrier wave signal; a generator coupled to said key signal extracting means and responsive to the key signal therefrom to produce a signal representing said first portion of said coding schedule; code selector apparatus coupled to said generator for reproducing said second portion of said coding schedule; and an actuator controlled conjointly by said signal representing said first portion of said coding schedule and by said code selector apparatus and coupled to said decoding apparatus to operate said decoding apparatus in accordance with the combined first and second portions of said coding schedule.

13. A subscriber receiver for utilizing a coded carrier wave signal having modulation components representing transmitted intelligence and having an interposed key signal, said modulation components occurring in different modes from time to time and each change of mode occurring a predetermined time after said key signal, according to a coding schedule having first and second portions, said receiver comprising: a reproducing device for utilizing said modulation components; circuit means for supplying said modulation components to said device; decoding apparatus coupled to said circuit means and responsive to an applied signal to shift from one operating condition to another operating condition for effectively compensating said different modes of said modulation components before application of said components to said reproducing device; means for extracting said key signal from said carrier wave signal; a generator coupled to said key signal extracting means and responsive to the key signal therefrom to produce a signal representing said first portion of said coding schedule; code selecting apparatus coupled to said generator and operative upon the signal produced thereby to provide a signal representing the complete coding schedule; and means coupling said code selecting apparatus to said decoding apparatus for operating said decoding apparatus in accordance with said signal representing the complete coding schedule.

GEORGE V. MORRIS.
BERTRAND J. MILLER.

References Cited in the file of this patent

UNITED STATES PATENTS

| Number | Name | Date |
|---|---|---|
| 2,164,176 | Goldsmith | June 27, 1939 |
| 2,251,525 | Rosenthal | Aug. 5, 1941 |
| 2,275,540 | Mattke | Mar. 10, 1942 |
| 2,306,435 | Graham | Dec. 29, 1942 |
| 2,335,983 | Wilson | Dec. 7, 1943 |
| 2,402,067 | Mathes | June 11, 1946 |
| 2,403,009 | McCann | July 2, 1946 |
| 2,403,059 | Dillenback et al. | July 2, 1946 |
| 2,403,540 | Meneley | July 9, 1946 |
| 2,405,252 | Goldsmith | Aug. 6, 1946 |
| 2,406,811 | Deloraine | Sept. 3, 1946 |
| 2,408,117 | Young | Sept. 24, 1946 |
| 2,414,101 | Hogan | Jan. 14, 1947 |
| 2,419,568 | Labin | Apr. 29, 1947 |
| 2,472,774 | Mayle | June 7, 1949 |
| 2,510,046 | Ellett et al. | May 30, 1950 |

FOREIGN PATENTS

| Number | Country | Date |
|---|---|---|
| 928,783 | France | Sept. 22, 1944 |